United States Patent
Little

(10) Patent No.: US 10,430,402 B2
(45) Date of Patent: Oct. 1, 2019

(54) DISTRIBUTED TRANSACTION WITH DYNAMIC FORM

(71) Applicant: Red Hat, Inc., Raleigh, NC (US)

(72) Inventor: Mark Little, Ebchester (GB)

(73) Assignee: RED HAT, INC., Raleigh, NC (US)

( * ) Notice: Subject to any disclaimer, the term of this patent is extended or adjusted under 35 U.S.C. 154(b) by 446 days.

(21) Appl. No.: 14/599,274

(22) Filed: Jan. 16, 2015

(65) Prior Publication Data

US 2016/0210322 A1 Jul. 21, 2016

(51) Int. Cl.
G06F 16/23 (2019.01)
G06F 9/46 (2006.01)

(52) U.S. Cl.
CPC .......... *G06F 16/2343* (2019.01); *G06F 9/466* (2013.01)

(58) Field of Classification Search
CPC ............................................... G06F 17/30362
USPC ............................................................ 707/703
See application file for complete search history.

(56) References Cited

U.S. PATENT DOCUMENTS

| | | | |
|---|---|---|---|
| 6,115,715 A * | 9/2000 | Traversat | G06F 9/466 707/703 |
| 6,442,552 B1 * | 8/2002 | Frolund | G06F 17/30861 707/613 |
| 6,526,416 B1 | 2/2003 | Long | |
| 7,380,166 B2 | 5/2008 | Thatte et al. | |
| 7,386,675 B2 | 6/2008 | Fachan | |
| 7,552,072 B2 | 6/2009 | Mulholland et al. | |
| 7,725,446 B2 * | 5/2010 | Huras | G06F 9/466 707/703 |
| 7,904,434 B2 * | 3/2011 | Yalamanchi | G06F 16/2336 707/703 |
| 8,005,805 B2 * | 8/2011 | Pardon | G06F 9/466 707/703 |
| 8,010,756 B1 | 8/2011 | Linde | |
| 8,346,851 B2 | 1/2013 | Little | |
| 8,347,300 B2 | 1/2013 | McLean et al. | |
| 8,386,440 B2 | 2/2013 | Lomet et al. | |
| 8,464,270 B2 | 6/2013 | Little | |
| 8,612,989 B1 | 12/2013 | Richards et al. | |

(Continued)

OTHER PUBLICATIONS

Dinn et al., "Transactions XTS Administration and Development Guide," Jul. 12, 2010, downloaded from http://docs.jboss.org/jbosstm/4.17.0.Final/guides/xts-administration_and_development_guide/index.html on on Nov. 27, 2014.

(Continued)

*Primary Examiner* — Ashish Thomas
*Assistant Examiner* — Abdullah A Daud
(74) *Attorney, Agent, or Firm* — K&L Gates LLP

(57) ABSTRACT

Various examples are directed to systems and methods for executing distributed transactions with dynamic form. A transaction coordinator may send to a first transaction node a commit request indicating a first transaction operation and a first object and receive an indication that the first transaction node holds a lock for the first object. The transaction coordinator may also send to a second transaction node a commit request indicating a second transaction operation and a second object and receive an indication that the second transaction node is one-phase-aware. If the number of enrolled transaction nodes includes at least a threshold number of nodes, the distributed transaction may be converted to a compensation transaction.

22 Claims, 6 Drawing Sheets

(56) References Cited

U.S. PATENT DOCUMENTS

| | | | | |
|---|---|---|---|---|
| 9,027,030 | B2* | 5/2015 | Little | G06F 13/385 |
| | | | | 719/313 |
| 9,055,065 | B2* | 6/2015 | Little | H04L 67/10 |
| 9,201,919 | B2* | 12/2015 | Little | G06F 17/30371 |
| 9,417,906 | B2* | 8/2016 | Little | G06F 9/466 |
| 9,576,038 | B1* | 2/2017 | Huang | G06F 16/27 |
| 2002/0194244 | A1 | 12/2002 | Raventos | |
| 2004/0148289 | A1* | 7/2004 | Bamford | G06F 16/2379 |
| 2005/0044451 | A1* | 2/2005 | Fry | G06F 11/008 |
| | | | | 714/38.1 |
| 2009/0144750 | A1* | 6/2009 | Little | G06F 13/385 |
| | | | | 719/313 |
| 2010/0217931 | A1* | 8/2010 | Beaman | G06F 11/1471 |
| | | | | 711/114 |
| 2011/0246822 | A1 | 10/2011 | Little | |
| 2013/0036106 | A1* | 2/2013 | Lucas | G06F 17/30283 |
| | | | | 707/703 |
| 2013/0262423 | A1* | 10/2013 | Graefe | G06F 17/30362 |
| | | | | 707/703 |
| 2016/0103866 | A1* | 4/2016 | Robinson | G06F 16/2365 |
| | | | | 707/703 |

OTHER PUBLICATIONS

Jankiewicz et al., "Transaction Mechanisms in Complex Business Processes," Control and Cybernetics, vol. 40, No. 3 (2011).

Kang et al., "STAR: Secure Real-Time Transaction Processing with Timeliness Guarantees," downloaded from http://www.cs.virginia.edu/~stankovic/psfiles/star.ps on Jan. 15, 2014.

Salzberg et al., "DSDT: Durable Scripts Containing Database Transactions," Proceedings of the Twelfth International Conference on Data Engineering, pp. 624-633, 1996.

Stadtfeld et al., "Analysing Event Stream Dynamics in Two Mode Networks," 2010. Downloaded on Jan. 15, 2015 from http://www.insna.org/PDF/Awards/awards_student_2010.pdf.

"Managing Resources," downloaded from http://www.scimore.com/Documentation/Managing_resources.html on Dec. 1, 2014.

"Teradata Viewpoint, User Guide" Release 14.00, B035-2206-111A, Nov. 2011, downloaded from http://d289lrf5tw1zls.cloudfront.net/doc/viewpoint/14.00/2206_User_14.00.pdf on Jan. 15, 2015.

\* cited by examiner

DISTRIBUTED TRANSACTION WITH DYNAMIC FORM

BACKGROUND

A distributed transaction is a transaction including operations that are performed by multiple nodes, often implemented at multiple networked computer systems. Distributed transactions arise in a number of different contexts. For example, processing an employee's paycheck may involve a distributed transaction with operations performed by nodes at a number of individual computer systems. An employer payroll system node may request a transfer from its own account to the account of the employee. A node at the employer's bank may debit the employer's account by the amount of the transfer. A node at the employee's bank may credit the employee's account by the amount of the transfer. In another example, booking travel may involve a distributed transaction. A travel agent system node may request reservations on various flights, hotels, etc. In response to the requests, one or more airline system nodes may book flight tickets for a traveler. One or more hotel system nodes may create reservations for the traveler, etc.

In distributed transactions, it is desirable to satisfy the properties of Atomicity, Consistency, Isolation and Durability, known commonly as ACID properties. A distributed transaction satisfying the Atomicity property either successfully executes to completion or fails completely. Referring to the paycheck example, if the employer's bank system crashes or otherwise fails to debit the employer's account, Atomicity would require that the bank system be prevented from completing the transfer to the employee's account. A transaction meeting the Consistency property does not violate integrity constraints of any shared objects. The Isolation property requires that intermediate effects of the transaction are not detectable to concurrent transactions. The Durability property requires that changes to shared objects due to the transaction are permanent.

To ensure the Atomicity property, all participants of the distributed transaction coordinate their actions so that they either unanimously abort or unanimously commit to the transaction. For example, a transaction manager node (e.g., a coordinator node) may enforce Atomicity by coordinating a distributed transaction according to an atomic commit protocol. Atomic commit protocols typically have multiple phases. In a first phase, commonly known as a prepare phase, the coordinator node asks all other nodes participating in the transaction whether they will commit to the transaction. Nodes commit to the transaction by obtaining appropriate locks for transaction objects, executing a transaction operation or operations, and holding the object locks until the coordinator node either completes or aborts the transaction. In a subsequent phase, the transaction coordinator determines whether all transaction nodes have committed. If all nodes have committed, then the transaction coordinator completes the transaction, allowing the nodes to release their locks. If the transaction is aborted, the participating transaction nodes reverse their operations and then release their locks. Accordingly, Atomicity is satisfied because all of the transaction operations are either completed, or not completed.

Some distributed transactions do not always satisfy Atomicity. For example, according to a compensation transaction, participating transaction nodes execute their operation or operations and release their locks before it is known whether the distributed transaction has succeeded or failed. A compensation action is generated for each participating transaction node. If the distributed transaction fails (e.g., if one of the participating transaction nodes cannot execute its operation or operations), then the coordinator node instructs any participating transaction nodes that have already executed operations to "undo" the operations by executing their compensation action.

SUMMARY

Various examples are directed to systems and methods for executing distributed transactions with dynamic form. A transaction coordinator may send to a first transaction node a commit request indicating a first transaction operation and a first object and receive an indication that the first transaction node holds a lock for the first object. The transaction coordinator may also send to a second transaction node a commit request indicating a second transaction operation and a second object and receive an indication that the second transaction node is one-phase-aware. If the number of enrolled transaction nodes includes at least a threshold number of nodes, the distributed transaction may be converted to a compensation transaction. If the number of enrolled transaction nodes does not include the threshold number of nodes, the distributed transaction may be completed according to an atomic commit protocol.

According to additional examples, the coordinator node may enroll a first transaction and receive a commit message from the first transaction node indicating that the first transaction node holds a lock for executing a first transaction operation. The coordinator node may also enroll a second transaction node and receive an indication that the second transaction node is one-phase-aware. The coordinator node may determine that a number of enrolled transactions comprises at least a threshold number of nodes that are one-phase-aware, request that the first transaction node release the lock, and store a compensation transaction for the first transaction node.

FIGURES

Various examples are described herein in conjunction with the following figures, wherein.

DESCRIPTION

Various examples are directed to systems and methods for implementing distributed transactions with dynamic form. For example, a distributed transaction may be initiated according to an atomic commit protocol. If during execution, a coordinator node finds that the transaction cannot be completed according to the atomic commit protocol, it may dynamically convert the transaction to a compensation transaction. Accordingly, the distributed transaction may be initiated in a form that satisfies ACID properties such as Atomicity even when there is a risk that it cannot be completed that way.

In various examples, a coordinator node may begin a distributed transaction according to an atomic commit protocol (e.g., a protocol having two or more phases). The coordinator node may enroll transaction nodes according to the atomic commit protocol. If the coordinator node encounters more than a threshold number of transaction nodes that are not configured to take part in atomic commit protocols (e.g., one-phase-aware nodes), then it may convert the transaction from an atomic commit protocol transaction to a compensation transaction. In some examples, converting the transaction to a compensation transaction comprises instructing some or all of the transaction nodes to release locks held on transaction objects. A compensation action may be generated for each transaction node, for example, by the transaction nodes themselves and/or by the coordinator node. Additional transaction nodes enrolled after the conversion, if any, may be requested to perform their transaction operations without holding locks. Compensation actions may be generated for the additional transaction nodes, if any.

Figure 1:
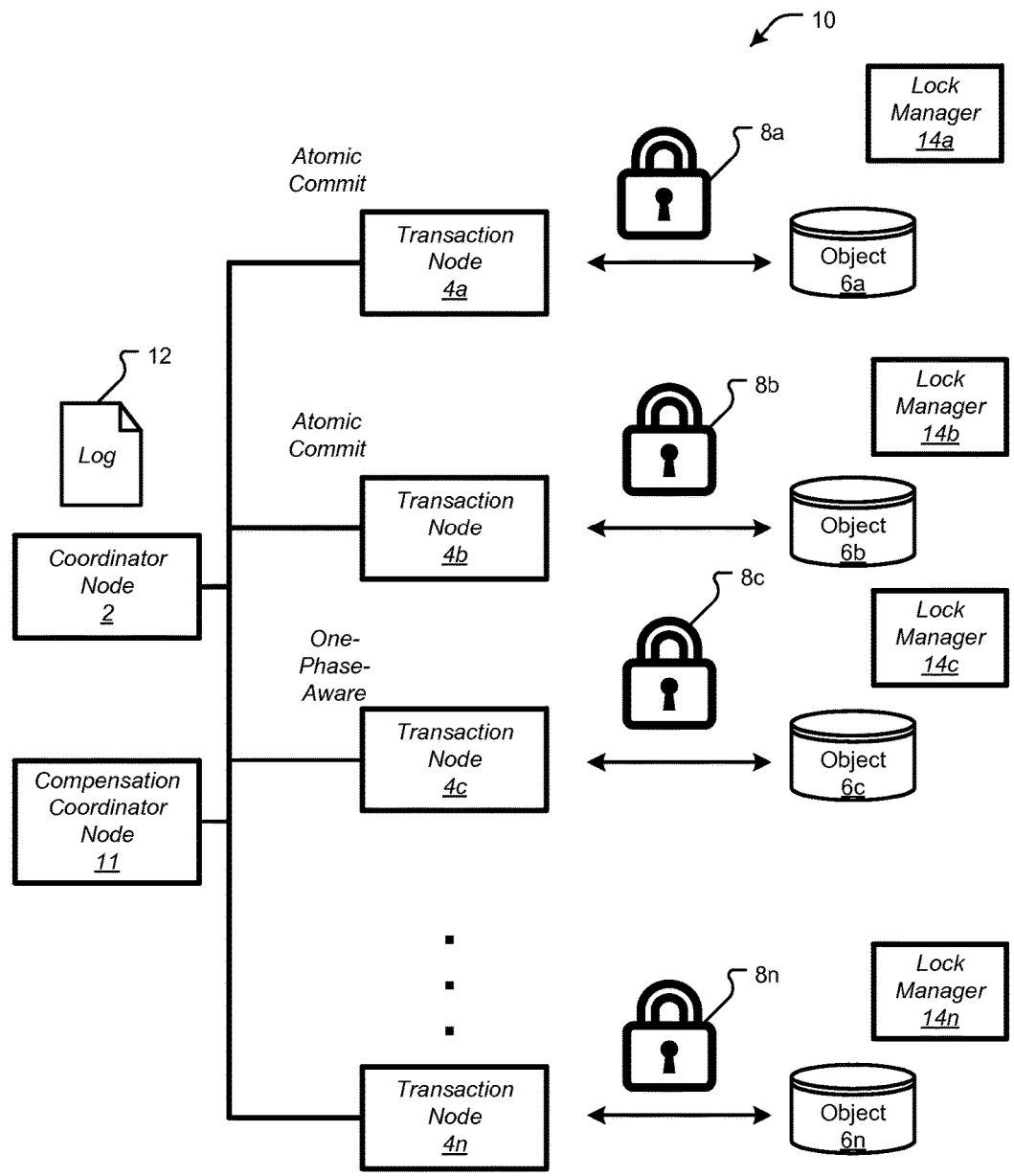
FIG. 1 is a diagram showing one example of an environment for implementing distributed transactions with dynamic form.

FIG. 1 is a diagram showing one example of an environment 10 for implementing distributed transactions with dynamic form. A coordinator node 2 may enroll one or more participating transaction nodes 4a, 4b, 4c, 4n. Any suitable number of transaction nodes 4a, 4b, 4c, 4n may be used, for example, based on the nature of the distributed transaction. Each transaction node 4a, 4b, 4n may perform a transaction operation that involves manipulating a transaction object 6a, 6b, 6n. Objects 6a, 6b, 6n may be any type of resource, such as resources having a state that can be manipulated. Examples may include data files, databases, database tables, messaging systems, language level objects, etc.

Figure 2:
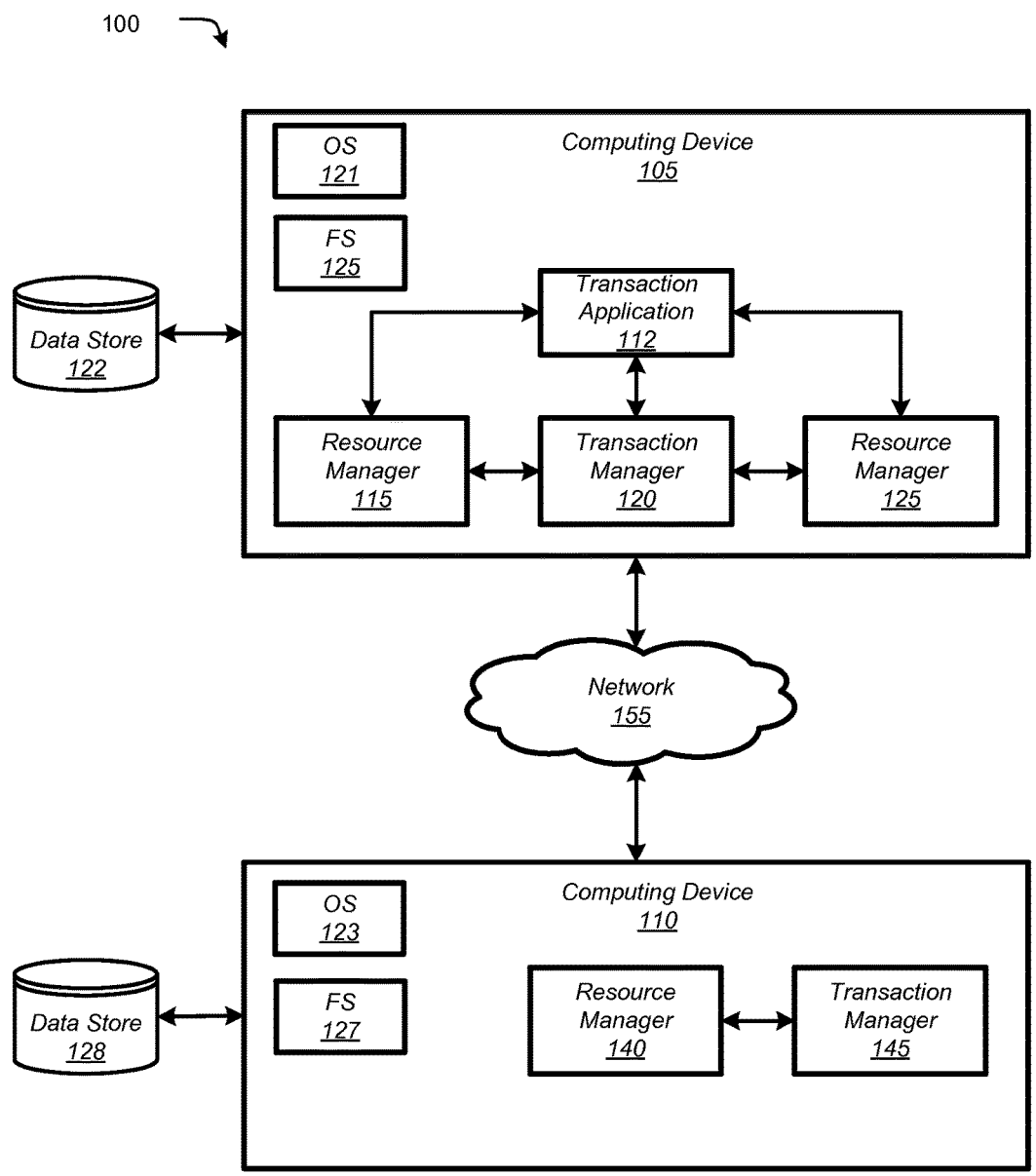
FIG. 2 shows an example of a distributed computing system that may execute various components of a distributed transaction with dynamic form.

The coordinator node 2 may enroll each of the transaction nodes 4a, 4b, 4c, 4n to perform an assigned operation or operations on one or more objects 6a, 6b, 6c, 6n. The coordinator node 2 may initially enroll the transaction nodes 4a, 4b, 4c, 4n according to an atomic commit protocol such as, for example, a two or three-phase protocol. The transaction nodes 4a, 4b, 4c, 4n may be enrolled in any suitable order. For example, the coordinator node 2 may enroll the transaction node 4a first. When enrolled, the transaction nodes 4a, 4b, 4c, 4n may obtain one or more locks 8a, 8b, 8c, 8n corresponding to the object or objects 6a, 6b, 6c, 6n that the transaction node 4a, 4b, 4c, 4n is to modify according to its assigned operation. The locks 8a, 8b, 8c, 8n may be obtained from one or more lock managers 14a, 14b, 14c, 14d, 14n. The lock managers 14a, 14b, 14c, 14c, 14n may be executed at a computing device at or near a computing device where the respective objects 6a, 6b, 6c, 6n are stored. The lock managers 14a, 14b, 14c, 14n may be positioned to intercept read and write requests directed to the respective objects 6a, 6b, 6c, 6n. For example, some or all of the lock managers 14a, 14b, 14c, 14n may be part of an operating system, a file system, or other similar component executing at a computing device that is positioned to manage the respective objects 6a, 6b, 6c, 6n. In some examples, the lock managers 14a, 14b, 14c, 14n may be implemented in hardware, for example, by a suitable data storage device 122, 128 (FIG. 2). In some examples, some or all of the objects 6a, 6b, 6c, 6n may share a common lock manager.

Each transaction node 4a, 4b, 4c, 4n may report to the coordinator node 2 whether it is configured for the atomic commit protocol. The coordinator node 2 may maintain a log 12 indicating information about the state of each enrolled transaction node. In the example of FIG. 1, nodes 4a and 4b are configured for the atomic commit protocol while node 4c is one-phase-aware (e.g., not configured for the atomic commit protocol). Transaction node 4n has not yet been enrolled by the coordinator node 2. If the number of one-phase-aware transaction nodes 4a, 4b, 4c, 4n reaches a threshold value (e.g., one or two), then the coordinator node 2 may convert the transaction to a compensation transaction. Converting the transaction to a compensation transaction may comprise instructing previously enrolled atomic commit nodes, such as 4a and 4b to release their locks 8a, 8b and generating, for each enrolled atomic commit node, a compensation action. In some examples, the coordinator node 2 stores compensation actions for each node 4a, 4b, 4c, 4n at the log 12. The compensation action, when executed by the nodes 4a, 4b may reverse the transaction operation previously executed by the nodes 4a, 4b. Some nodes 4a, 4b, 4c, 4n may generate their own compensation actions, which may then be communicated to the coordinator node 2. In some examples, the coordinator node 2 may generate compensation actions for one or more of the transaction nodes 4a, 4b, 4c, 4n. Transaction nodes enrolled after the conversion, such as transaction node 4n, may be enrolled according to the compensation transaction. For example, regardless of whether the node 4n is one-phase-aware or supports atomic commit, the node 4n may be instructed to perform an assigned transaction operation or operations. The node 4n may obtain a lock 8n for the object 6n and execute the assigned transaction operation or operations. Upon completing the assigned transaction operation or operations, the node 4n may release its lock 8n. A compensation action for the node 4n may be generated, for example, by the node 4n itself and/or by the coordinator node 2.

In some examples, the coordinator node 2 may convert the transaction to a compensation transaction by handing over responsibility for coordinating the transaction to a compensation coordinator node 11. For example, the coordinator node 2 may transfer the log 12 or other indication of its state to the compensation coordinator node 11. The compensation coordinator node 11 may instruct enrolled atomic commit-enabled nodes, such as 4a and 4b, to release their locks and generate compensation actions. The compensation coordinator node 11 may also coordinate the enrollment of subsequent nodes.

FIG. 2 shows an example of a distributed computing system 100 that may execute various components of a distributed transaction with dynamic form. For example, the distributed computing system 100 may execute the coordinator nodes 2, 11, participating transaction nodes 4a, 4b, 4c, 4n and other components described above. The distributed computing system 100 may comprise one or more computing devices 105, 110. The computing devices 105, 110 may comprise any suitable type of computing device or machine that has a programmable processor including, for example, one or more servers, one or more desktop computers, one or more laptop computers, one or more routers, etc. In some examples, one or both of the computing devices 105, 110 may comprise a single machine or may include multiple interconnected machines (e.g., multiple servers configured in a cluster). Although two computing devices 105, 110 are shown, any suitable number of computing devices may be utilized in the distributed transactions described herein.

Computing devices 105, 110 may execute respective operating systems (OSs) 121, 123. Any suitable operating system may be used including, for example, any suitable LINUX operating system (e.g., available from RED HAT, INC.), any suitable WINDOWS operating system available from MICROSOFT CORPORATION, any suitable UNIX operating system, any suitable OS operating system available from APPLE, INC., any suitable ANDROID operating system available from GOOGLE, any suitable iOS operating system available from APPLE INC., etc. The operating systems 121, 123 may manage execution of the various other components at the computing devices 105. In some examples, the operating systems 121, 123 may facilitate communication between the components and system hardware, such as data stores 122, 128. In some examples, computing devices 105, 110 comprise and/or are in communication the one or more data stores 122, 128. Data stores 122, 128 may be organized according to a file system 125, 127 that may be in communication with the operating system 121, 123. In some examples, data stores 122, 128 are organized according to and/or comprise any suitable database, and/or other data storage arrangement. Data stores 122, 128 may be internal to computing devices 105, 110, or external and connected to computing device 105, 110 either directly or via a network, such as the network 155. In some examples, data stores 122 may comprise transaction objects, such as 6a, 6b, 6c, 6n described above, that may be manipulated during distributed transactions. In some examples, lock managers 14a, 14b, 14c, 14n described herein may be implemented by the operating systems 121, 123, the file systems 125, 127 and/or the data stores 122, 128.

The computing devices 105, 110 may be in communication with one another via a network 155. The network 155 may be any suitable wired and/or wireless network and may comprise, for example, one or more local area networks (LANs), one or more wide area networks (WANs), one or more public networks such as the Internet, etc. The network 155 may carry communications between components 115, 125, 140, 120, 145 (e.g., components not executing on the same computing device). In some examples, distributed transactions may be executed without using the network 155. For example, the distributed computing system 100 may be implemented on a single computing device 105 or 110. Also, for example, the computing devices 105, 110 may be directly connected to one another.

In the example of FIG. 2, the computing device 105 comprises resource managers 115, 125, a first transaction manager 120, and a transaction application 112. The computing device 110 comprises a resource manager 140 and a transaction manager 145. The resource managers 115, 125, 140 may be or comprise any suitable component of the distributed computing system 100 that is configured to manage objects (e.g., objects stored at the data stores 122, 128). Resource managers 115, 125, 140 may be executed by one or both of the computing devices 105, 110 to manage a storage system, which may be a persistent and stable storage system such as the data stores 122, 128. The resource managers 115, 125, 140 may comprise any manager configured to manage a storage system including, for example, a file manager, a database, a messaging service, etc. Examples of resource managers include relational databases, an executive information system (EIS), a Java Message Service (JMS) provider configured to manage transactional message delivery, etc.

The transaction managers 120, 145 may be executed at one or both of the computing devices 105, 110 and are programmed to coordinate distributed transactions. In some examples, a transaction manager 120, 145 acts as a coordinator node that coordinates multiple participating transaction nodes during a distributed transaction, such as a distributed transaction with dynamic form. The participating transaction nodes may include, other transaction managers 120, 145, or local resource managers 115, 125, 140. In some examples, transaction managers 120 145 may take part in distributed transactions as a participating transaction node when a distributed transaction can be broken into constituent distributed transactions. The transaction manager 120 may be configured as a master coordinator node and may instruct one or more of the resource managers 115, 125, 140 to perform one or more operations on objects to implement the transaction. Additionally, the transaction manager 120 may instruct the transaction manager 145 to coordinate a second distributed transaction that is a constituent of the first distributed transaction. Accordingly, the transaction manager 145 may instruct one or more of the resource managers 115, 125, 140 regarding operations according to the second distributed transaction.

The transaction application 112 may be an application that requests a distributed transaction. For example, a referring to the paycheck processing example, a transaction application may be an application at a computing device of the employer that requests the paycheck processing transaction. Referring to the travel booking example, a transaction application may be an application associated with a travel agent, an Internet-provided application with which a user can initiate a reservation request, etc. A transaction manager such as 120, 145 may establish a new transaction upon receiving a request from a transaction application 112 to perform the transaction. A transaction application 112 may be any application that requests that operations be performed transactionally or that otherwise causes distributed transactions to be initiated. The transaction application 112 may be co-located with the first transaction manager 120 (as shown), or may be located on a remote machine (e.g., on computing device 110).

Figure 3:
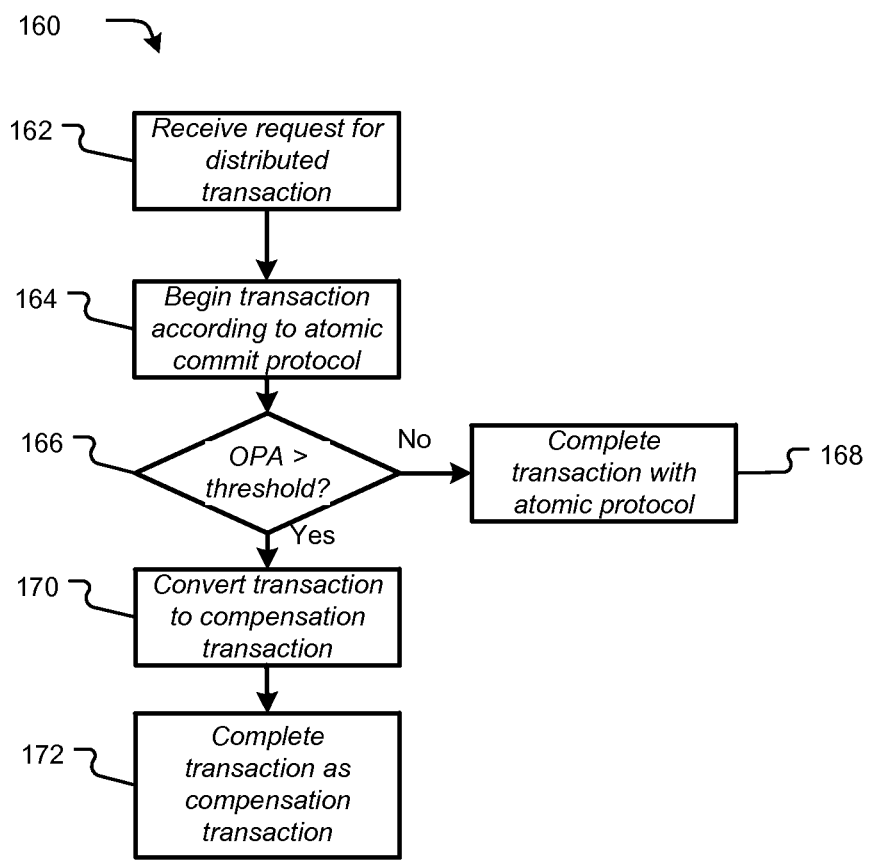
FIG. 3 is a flow chart showing one example of a process flow for implementing a distributed transaction with dynamic form.

FIG. 3 is a flow chart showing one example of a process flow 160 for implementing a distributed transaction with dynamic form. For example, the process flow 160 may be executed by a coordinator node 2, as described herein. At 162, the coordinator node 2 may receive a request for a distributed transaction. The coordinator node 2, in some examples, may be implemented with one of the transaction managers 120, 145. Also, in some examples the request for the distributed transaction may be received from the transaction application 112, as described herein.

At 164, the coordinator node 2 may begin the distributed transaction according to an atomic commit protocol such as, for example, a two-phase or three-phase commit protocol. For example, the coordinator node may enroll a transaction node 4a by querying whether the transaction node 4a supports the atomic commit protocol. In the example of FIG. 1, the transaction node 4a does support the atomic commit protocol, and may indicate so to the coordinator node 2, for example, by sending a message to the coordinator node 2. The coordinator node 2 may send the transaction node 4a a commit request indicating a transaction operation to be executed by the transaction node 4a. The transaction node 4a may attempt to obtain a lock 8a corresponding to an object 6a to be manipulated in the transaction operation. If the transaction node 4a is successful in obtaining the lock 8a, it may execute the transaction operation, continue to hold the lock 8a, and send a commit message to the coordinator node 2. For example, the commit message may indicate that the transaction node 4a holds the lock 8a on the object 6a. If the transaction node 4a is unsuccessful in obtaining the lock 8a, it may send a failure message to the coordinator node 2. In some examples, the commit or failure message may be the indication of whether the transaction node 4a supports the atomic commit protocol. The coordinator node 2 may record information about the transaction node 4a at the log 12. The information may include, for example, the transaction operation assigned to the node 4a, whether the node 4a supports the atomic commit protocol, etc.

As described herein, some of the transaction nodes, such as the transaction node 4c, may be one-phase-aware (e.g., may not support the atomic commit protocol). The coordinator node 2 may enroll the transaction node 4c by querying whether it supports the atomic commit protocol. In some examples, the querying involves the coordinator node 2 sending the transaction node 4c a commit request according to the atomic commit protocol. The transaction node 4c may send a reply message indicating that it does not support the atomic commit protocol (e.g., that the transaction node 4c is one-phase-aware). The coordinator 2 may continue to enroll the transaction node 4c, for example, as described herein.

The coordinator node 2 may continue to enroll transaction nodes, such as 4a, 4b, 4c, 4n, for example, while there are additional participating transaction nodes to be enrolled. At 166, the coordinator node 2 may determine whether it has enrolled a threshold number of one-phase-aware transaction nodes. In some examples, the coordinator node 2 may evaluate whether it has enrolled the threshold number of one-phase-aware transaction nodes after enrolling each transaction node. The threshold number of transaction nodes may be any suitable number. In some examples, the threshold number of transaction nodes may be one. That is, the coordinator node 2 may convert the transaction to a compensation transaction if it encounters even one one-phase-aware transaction node. Also, in some examples, the threshold number of transaction nodes may be two. Any other suitable threshold number may be used, for example, based on how much risk of failed atomicity is acceptable in the distributed transaction.

If the number of one-phase-aware transaction nodes does not exceed the threshold, then the coordinator node 2 may complete the distributed transaction according to the atomic commit protocol and/or a hybrid protocol, as described herein. To complete the distributed transaction according to the atomic commit protocol, the coordinator 2 may determine whether any of the participating transaction nodes 4a, 4b, 4c, 4n failed to commit to the transaction. If all participating transaction nodes 4a, 4b, 4c, 4n have committed to the transaction, then the participating transaction nodes 4a, 4b, 4c, 4n may release their respective locks 8a, 8b, 8c, 8n and the distributed transaction may be complete. For example, the coordinator node 2 may send the participating transaction nodes 4a, 4b, 4c, 4n a success message indicating that the distributed transaction is successful. In some examples, in lieu of a success message, the participating transaction nodes 4a, 4b, 4c, 4n may infer the success of the distributed transaction if no abort message is received from the coordinator node 2 within a threshold time (e.g., a threshold time from when the participating nodes 4a, 4b, 4c, 4n were enrolled). If one or more transaction nodes 4a, 4b, 4c, 4n have failed to commit, then the remaining transaction nodes may be instructed to reverse their transaction operations and then release their locks. For example, the coordinator node 2 may send an abort message to the participating transaction nodes 4a, 4b, 4c, 4n. In some examples, in lieu of an abort message, the participating transaction nodes 4a, 4b, 4c, 4n may infer failure of the distributed transaction if no success message is received from the coordinator node 2 within a threshold time (e.g., a threshold time from when the participating nodes 4a, 4b, 4c, 4n were enrolled).

If the threshold number of one-phase-aware transaction nodes (or more) are enrolled, then the coordinator node 2 may convert the transaction to a compensation transaction, for example, as described herein. Converting the transaction to a compensation transaction may include, for example, referring to the log 12 to identify previously-enrolled atomic commit protocol transaction nodes. As described herein, these nodes may have already completed their assigned transaction operation and may be holding their lock or locks and awaiting additional instructions. The coordinator node 2 may instruct the previously-enrolled atomic commit protocol transaction nodes to release their locks. Either the coordinator node 2 or the transaction nodes themselves may generate compensation actions for the previously-enrolled atomic commit protocol transaction nodes. The compensation actions may un-do the assigned transaction operation for each node. In some examples, the coordinator node 2 may convert the transaction to a compensation transaction by passing the log 12 or another indication of the state of the coordinator node 2 to the compensation coordinator node 11. The compensation coordinator node 11 may then instruct the previously-enrolled atomic commit protocol transaction nodes to release locks and generate compensation actions. At 172, the coordinator node 2 (or the coordinator node 11) may complete the distributed transaction as a compensation transaction. For example, the coordinator node 2, 11 may enroll any additional participating transaction nodes. Enrollment after the conversion to a compensation transaction may involve requesting that the participating transaction nodes execute their assigned transaction operations (e.g., without holding locks) and generating, or requesting that the transaction nodes generate, compensation actions. In some examples, the coordinator node 2, 11 may generate compensation actions in addition to or instead of the transaction nodes. The coordinator node 2, 11 may store compensation actions for some or all of the participating transaction nodes at the log 12. The coordinator node 2, 11 may monitor whether any of the participating transaction nodes fail at their assigned operation. If so, the coordinator node 2, 11 may instruct the participating transaction nodes to execute their respective compensation actions.

Figure 4:
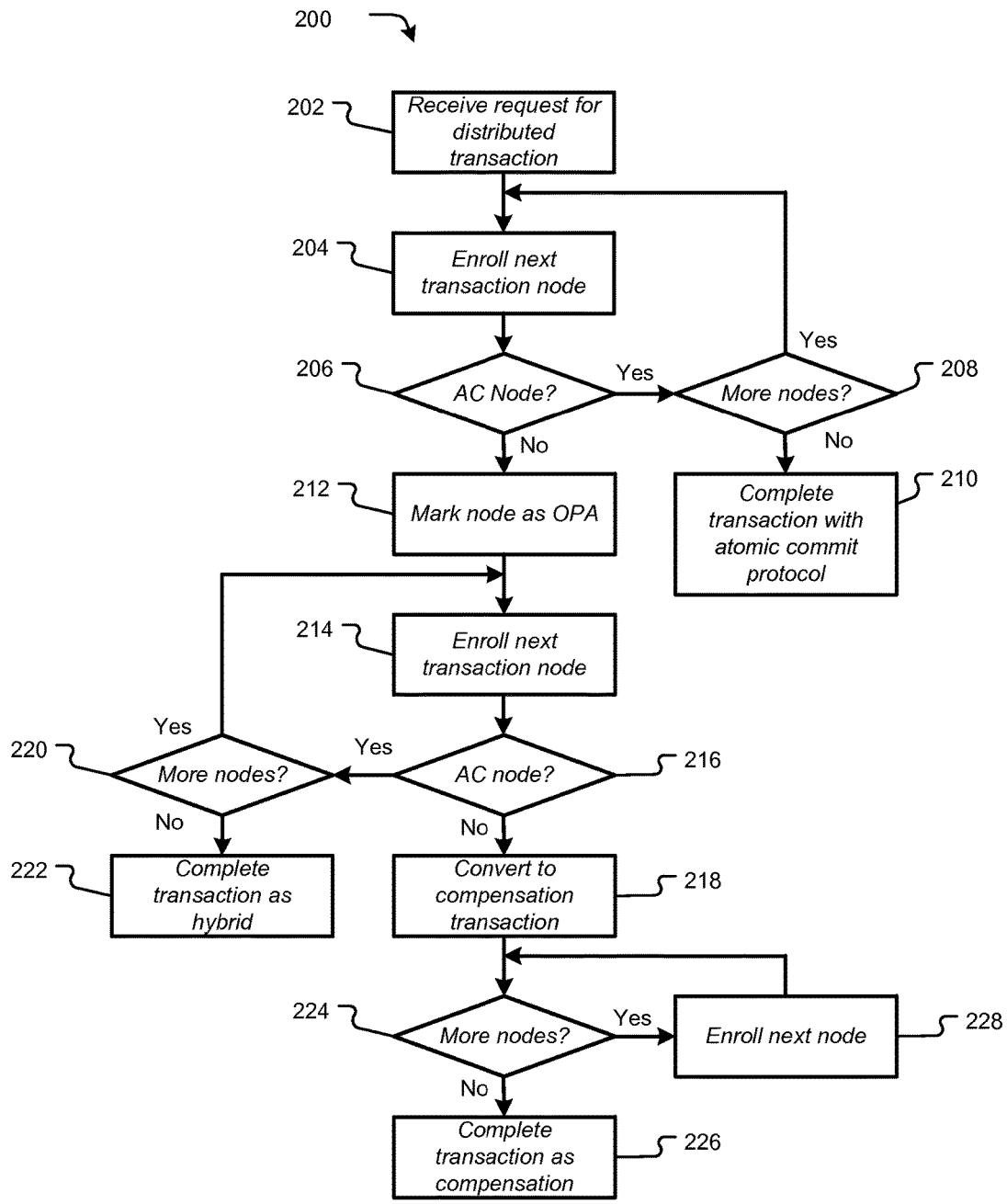
FIG. 4 is a flow chart showing one example of a process flow that may be executed by a coordinator node to implement a distributed transaction with dynamic form.

FIG. 4 is a flow chart showing one example of a process flow 200 that may be executed by a coordinator node 2 to implement a distributed transaction with dynamic form. In the example provided by process flow 200, the threshold number of one-phase-aware transaction nodes is two. At 202, the coordinator node 2 may receive a request for the distributed transaction, for example, as described herein. At 204, the coordinator node 2 may enroll the next transaction node (e.g., 4a, 4b, 4c, 4n) according to the atomic commit protocol. This may involve sending the transaction node a commit request or other query to determine whether the transaction node 4a, 4b, 4c, 4n supports the atomic commit protocol. At 206, the coordinator node 2 may determine whether the enrolled transaction node supports the atomic commit protocol. For example, if the transaction node commits to the transaction operation or fails to commit, as described herein, the coordinator node 2 may conclude that the transaction node supports the atomic commit protocol. On the other hand, if the transaction node responds to the commit request by sending an indication that it is one-phase-aware or otherwise does not support the atomic commit protocol, the coordinator node 2 may conclude that the transaction node does not support the atomic commit protocol.

If the coordinator node 2 determines that the enrolled transaction node does support the atomic commit protocol, it may determine at 208 whether there are additional transaction nodes to be enrolled. If there are additional transaction nodes to be enrolled, the coordinator node 2 may return to 204 and enroll the next transaction node. If no more transaction nodes 4a, 4b, 4c, 4n remain to be enrolled, the coordinator node 2 may, at 210, complete the distributed transaction according to the atomic commit protocol, for example, as described herein.

Referring back to 206, if the coordinator node 2 determines that an enrolled transaction node does not support the atomic commit protocol, it may mark the node as one-phase-aware at 212. For example, the coordinator node 2 may write to the log 12 an indication that the enrolled transaction node is one-phase-aware 212. At 214, the coordinator node 2 may enroll a next transaction node 4a, 4b, 4c, 4n, similar to 204 described above. At 216, it may determine whether the next transaction node supports the atomic commit protocol, similar to 206 above. If so, the coordinator node 2 may determine, at 220, whether there are additional nodes to be enrolled. If so, the coordinator node 2 may enroll the next transaction node at 214. If no transaction nodes remain to be enrolled, the coordinator node 2 may complete the distributed transaction as a hybrid transaction at 222. For example, the coordinator node 2 may determine whether all of the atomic commit protocol transaction nodes have committed to the distributed transaction. If all atomic commit protocol transaction nodes have committed to the distributed transaction, then the coordinator node 2 may request that the one-phase-aware transaction node execute its assigned transaction operation. If the one-phase-aware transaction node succeeds, then the coordinator node 2 may instruct the atomic commit protocol transaction nodes to complete the distribution transaction. If the one-phase-aware transaction node fails, then the coordinator node 2 may instruct the atomic commit protocol transaction nodes to abort the transaction. In this way atomicity may be satisfied.

Referring back to 216, if a second one-phase-aware transaction node is detected, the coordinator node 2 may convert the distributed transaction from an atomic commit protocol transaction to a compensation transaction at 218. This may be done as described herein, for example, with to FIG. 3. As described, in some examples, the coordinator node 2 may continue to coordinate the distributed transaction after conversion to a compensation transaction. In other examples, a compensation coordinator node 11 may coordinate the distributed transaction after conversion to a compensation transaction. For example, the coordinator node 2 may pass its state to the compensation coordinator node 11 (e.g., by passing the log 12). At 224, the coordinator node 2, 11 may determine if there are any additional participating transaction nodes to be enrolled. If so, the coordinator node 2, 11 may enroll the next node at 228. Enrolling the next node at 228 may involve, for example, requesting that the transaction node execute an assigned transaction operation (e.g., without holding locks) and generating, or asking the transaction node to generate, a compensation action. After enrolling the next node, the coordinator node 2, 11 may determine at 224 whether there are any additional participating transaction nodes to be enrolled. If no additional participating transaction nodes remain to be enrolled, the coordinator node 2, 11 may complete the transaction as a compensation transaction, for example, as described herein with respect to FIG. 3.

FIG. 4, at 222, describes an example where the distributed transaction is completed as a hybrid transaction if there is just one one-phase-aware transaction node. In some examples, if the threshold number of one-phase-aware transaction nodes is greater than two, then the coordinator 2 may accept the risk that transaction operations assigned to one or more of the one-phase-aware transaction nodes may need to be manually or automatically compensated if the transaction fails.

Figure 5:
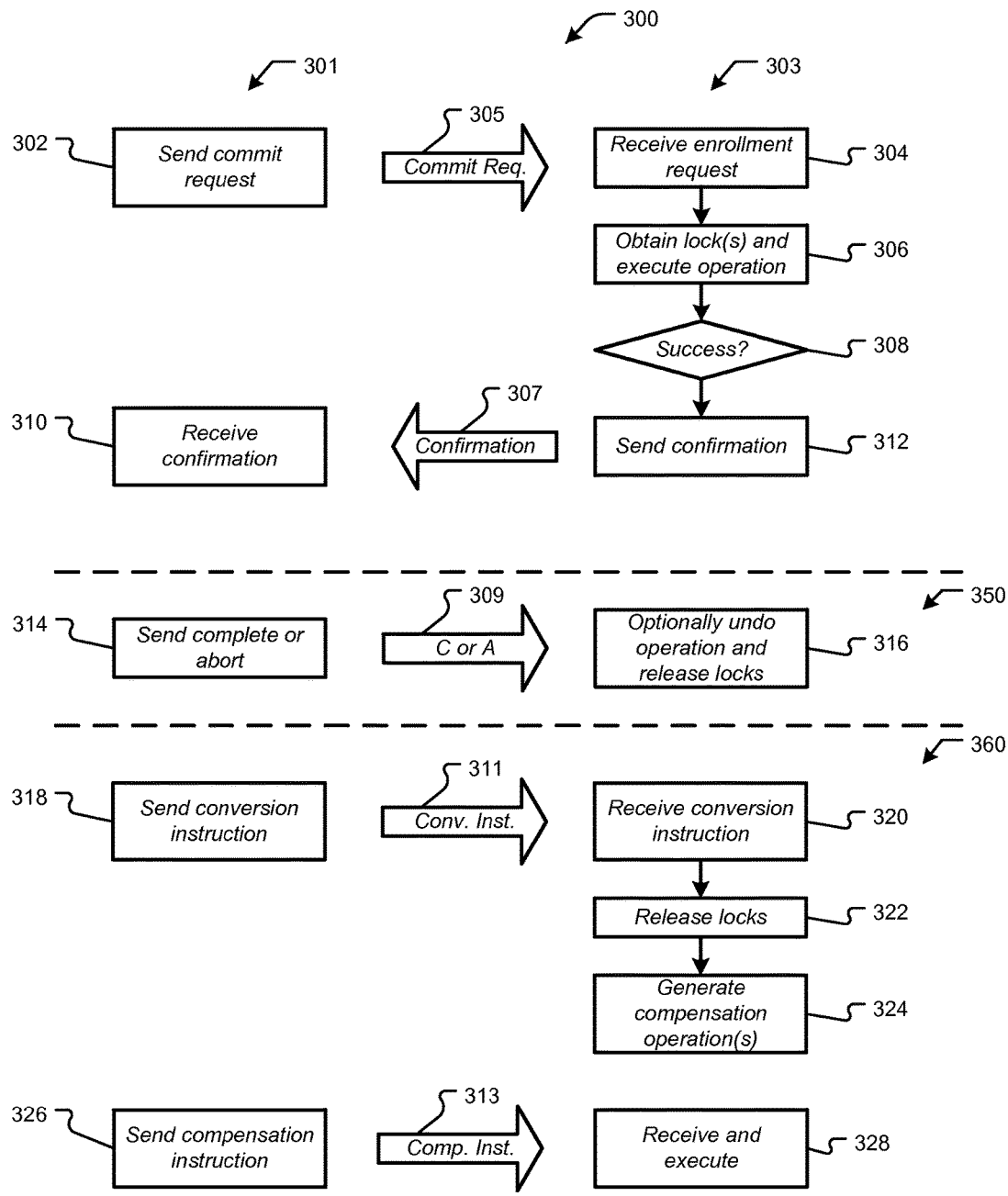
FIG. 5 is a flow chart showing one example process flow that may be executed by a coordinator node and an atomic-commit-protocol-enabled transaction node.

FIG. 5 is a flow chart showing one example process flow 300 that may be executed by a coordinator node 2 (or 11) and an atomic-commit-protocol-enabled transaction node, such as the transaction node 4a in FIG. 1. The process flow 300 is shown with two columns 301, 303. The column 301 includes actions that may be performed by a coordinator node 2 and/or a coordinator node 11. The column 303 includes actions that may be performed by the transaction node 4a. At 302, the coordinator node 2 may send a commit request 305 to the transaction node 4a. The commit request 305 may include, for example, an indication of an assigned transaction operation to be executed by the transaction node 4a. In some examples, the commit request 305 may also include an indication of an object (e.g., object 6a) that is to be manipulated by the assigned transaction operation. The transaction node 4a may receive the commit request 305 at 304. At 306, the transaction node 4a may attempt to obtain one or more locks (e.g. lock 8a) and execute the assigned operation on one or more objects (e.g., object 6a). At 308, the transaction node 4a may determine whether it was successful in obtaining the lock 8a and executing its assigned operation.

At 312, the transaction node 4a may send to the coordinator node 2 a confirmation 307. The confirmation 307 may indicate that the transaction node 4a is configured for the atomic commit protocol. It may also indicate whether the transaction node 4a was successful in executing the assigned operation. The coordinator node 2 may receive the confirmation at 307. After sending the confirmation 307, and provided that the execution of the operation was successful, the transaction node 4a may continue to hold the lock or locks obtained at 306. If the execution of the operation was not successful, the confirmation 307 may indicate that the transaction node 4a cannot commit to the distributed transactions. The coordinator node 2 may subsequently abort the distributed transaction. In some examples, the transaction node 4a may send a separate response message (not shown) after receiving the commit request but before attempting to execute its assigned operation. The separate response message may indicate that the transaction node 4a is configured for the atomic commit protocol.

In various examples, the next actions for the transaction node 4a and the coordinator node 2 may vary depending on the actions of other parties to the distributed transaction. For example, the actions shown at section 350 may be performed if the distributed transaction is not converted to a compensation transaction. That is, for example, if the distributed transaction is completed according to the atomic commit protocol. At 314, the coordinator 2 may send an instruction 309 that may be a complete instruction or an abort instruction. For example, the instruction 309 may be a complete instruction if all participating nodes successfully committed to the distributed transaction. The instruction 309 may be an abort instruction if one or more of the participating nodes failed to successfully commit to the distributed transaction.

At 316, the transaction node 4a may receive and respond to the instruction 309. For example, if the instruction 309 is a complete instruction, the transaction node 4a may release its locks. If the instruction 309 is an abort instruction, the transaction node 4a may reverse its assigned operation and then release its locks. Alternately, the coordinator node 2 may indicate the success or failure of the distributed transaction to the transaction node 4a by failing to send the instruction 309 (e.g., within a threshold time). For example, the transaction node 4a may be configured to interpret a failure to send a complete instruction as an indication to abort and/or a failure to send an abort transaction as an indication that the distributed transaction was successful.

Section 360 shows alternative actions that may be performed by the transaction node 4a and the coordinator node 2 (or 11) as an alternative to the actions at section 350. For example, the actions at section 360 may be performed if the transaction is converted to a compensation transaction after the transaction node 4a is enrolled. For example, after sending the confirmation at 312, the transaction node 4a may have completed its assigned transaction operation but may still hold locks on objects manipulated by the operation. At 318, the transaction coordinator 2 or 11 may send the transaction node 4a a conversion instruction 311. The conversion instruction 311 may indicate that the distributed transaction is being converted to a compensation transaction. The transaction node 4a may receive the conversion instruction at 320. At 322, the transaction node 4a may release its locks. At 324, the transaction node 4a may generate a compensation action, as described herein. Optionally, the transaction node 4a may send the compensation action to the coordinator node 2 or 11. Also, in some examples, in addition to or instead of the transaction node 4a generating the compensation action, the coordinator node 2 or 11 may generate the compensation action. If the distributed transaction succeeds, the transaction node 4a may take no further action. If the distributed transaction fails, then the coordinator node 2 or 11 may, at 326, send a compensation instruction 313. The compensation instruction 313 may instruct the transaction node 4a to execute its compensation action. In some examples (e.g., when the compensation action is stored at the coordinator node 2 or 11 only), the instruction 313 may comprise an indication of the compensation action. At 328, the transaction node 4a may receive and execute the compensation action.

Figure 6:
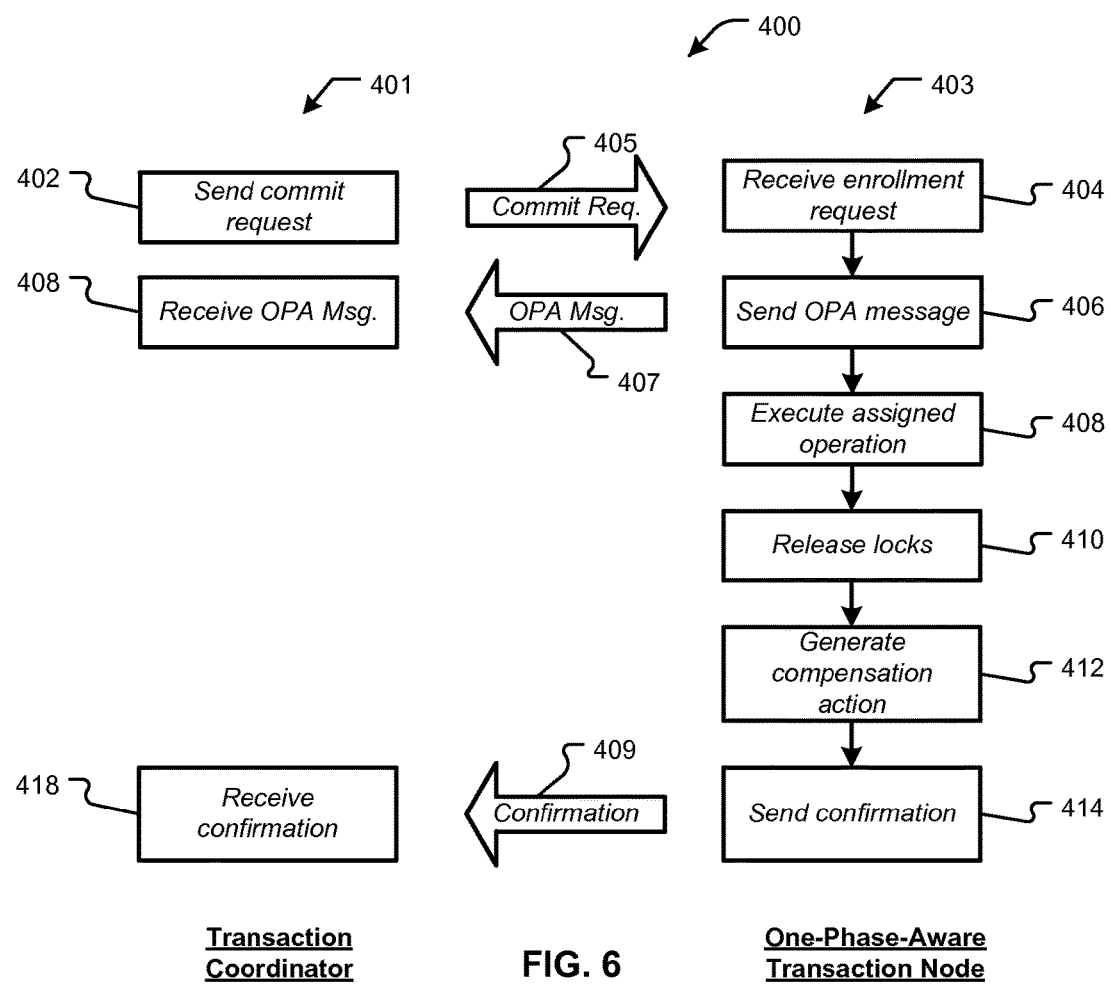
FIG. 6 is a flow chart showing one example process flow that may be executed by a coordinator node and a one-phase-aware transaction node.

FIG. 6 is a flow chart showing one example process flow 400 that may be executed by a coordinator node 2 (or 11) and a one-phase-aware transaction node, such as the transaction node 4c in FIG. 1. The process flow 400 is shown with two columns 401, 403. The column 401 includes actions that may be performed by a coordinator node 2 and/or a coordinator node 11. The column 403 includes actions that may be performed by the transaction node 4c. At 402, the coordinator node 2 or 11 may send a commit request 405 to the transaction node 4c. For example, if the distributed transaction has not been converted to a compensation transaction or the coordinator node 2 continues to coordinate the transaction after it has been converted to a compensation transaction, then the commit request may be received from the coordinator node 2. If the distributed transaction has been converted to a compensation transaction and is being coordinated by the compensation coordinator node 11, then the commit request 405 may be received from the compensation coordinator node 11.

At 404, the transaction node 4c may receive the commit request. The commit request 405 may indicate an assigned transaction operation for the transaction node 4c. In some examples, the commit request may also indicate an object (such as 6c) that is to be manipulated by the transaction operation. At 406, the transaction node 4c may send a one-phase-aware message 407 indicating to the coordinator node 2, 11 that the transaction node 4c is one-phase-aware. The coordinator node 2, 11 may receive the one-phase-aware message 407 and act, for example, as described herein with respect to the process flows 160, 200. At 408, the transaction node 4c may execute its assigned operation. For example, the transaction node 4c may obtain one or more locks (e.g., lock 8c) and manipulate one or more objects (e.g., object 6c). At 410, the transaction node 4c may release its locks. At 412, the transaction node 4c may generate a compensation action. Optionally, the compensation action may be generated by the coordinator node 2, 11 in addition or instead of being generated by the transaction node 4c. At 414, the transaction node may send a confirmation 409 to the coordinator node 2, 11. The confirmation 409 may indicate that the transaction node 4c successfully completed its assigned transaction operation.

In some examples, the transaction node 4c may fail to execute its assigned operation at 408. For example, the transaction node 4c may be unsuccessful in obtaining the required locks or may otherwise fail to complete the operation. If the transaction node 4c fails to execute its assigned operation, it may send the confirmation 409 after 408. The confirmation 409, in this case, may indicate that the transaction node 4c has failed to execute its assigned operation.

Reference in the specification to, "embodiments," "various example embodiments," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components of the environment 10 and the distributed computing system 100 may be and/or are executed by any suitable type of computing device including, for example, desktop computers, laptop computers, mobile phones, palmtop computers, personal data assistants (PDAs), etc. As used herein, a "computer," "computer system," "computer device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

I claim:

1. A computer-implemented system for coordinating a distributed transaction having a plurality of transaction nodes, including a first transaction node, a second transaction node, and a third transaction node, the system comprising:

at least one processor and operatively associated memory, wherein the at least one processor is programmed to execute a coordinator node for coordinating the distributed transaction, and wherein the coordinator node is programmed to:
    enroll the first transaction node according to an atomic commit protocol, wherein enrolling the first transaction node comprises sending the first transaction node a first commit request indicating a first transaction operation and a first object and writing to a log an indication that the first transaction node is atomic-commit-protocol-enabled;
    receive a commit message from the first transaction node, wherein the commit message comprises an indication that the first transaction node holds a lock for the first object;
    enroll the second transaction node, wherein enrolling the second transaction node comprises sending the second transaction node a second commit request indicating a second transaction operation and a second object and writing to the log an indication that the second transaction node is one-phase-aware;
    responsive to the second transaction node (i) receiving the commit request and (ii) being unable to support the atomic commit protocol, receive from the second transaction node a reply message indicating that the second transaction node is one-phase-aware;
    responsive to receiving the reply message, determine that at least two transaction nodes of the plurality of transaction nodes are one-phase-aware by reading from the log at least the indication that the second transaction node is one-phase-aware;
    responsive to determining that the at least two transaction nodes are one-phase aware, request that the first transaction node release the lock for the first object;
    store a compensation action for the first transaction node, wherein the compensation action, when executed, reverses the first transaction operation; and
    after requesting that the first transaction node release the lock for the first object, enroll the third transaction node.

2. The system of claim 1, wherein the coordinator node is further programmed to generate the compensation action for the first transaction node.

3. The system of claim 1, wherein the coordinator node is further programmed to receive the compensation action from the first transaction node.

4. The system of claim 1, wherein the coordinator node is further configured to receive a request to coordinate the distributed transaction.

5. The system of claim 1, wherein enrolling the third transaction node comprises:
    sending the third transaction node a request to execute a third transaction operation on a third object; and
    storing a compensation transaction for the third transaction node, wherein the compensation action for the third transaction node, when executed, reverses the third transaction operation.

6. The system of claim 5, wherein the coordinator node is further programmed to:
    receive from the third transaction node an indication that the third transaction operation has failed;
    send to the first transaction node an instruction to execute the compensation action for the first transaction node; and
    send to the second transaction node an instruction to execute a compensation action for the second transaction node.

7. A computer-implemented system for coordinating a distributed transaction having a plurality of transaction nodes, including a first transaction node, a second transaction node, and a third transaction node, the system comprising:
    at least one processor and operatively associated memory, wherein the at least one processor is programmed to execute a coordinator node for coordinating the distributed transaction, and wherein the coordinator node is programmed to:
        send to the first transaction node a commit request indicating a first transaction operation and a first object;
        write to a log an indication that the first transaction node is atomic-commit-protocol-enabled;
        receive from the first transaction node a first indication that the first transaction node holds a lock for the first object;
        send to the second transaction node a commit request indicating a second transaction operation and a second object;
        write to the log an indication that the second transaction node is one-phase-aware;
        responsive to the second transaction node (i) receiving the commit request and (ii) being unable to support the atomic commit protocol, receive from the second transaction node a reply message indicating that the second transaction node is one-phase-aware;
        responsive to receiving the reply message, determine that at least two transaction nodes of the plurality of transaction nodes are one-phase-aware by reading from the log at least the indication that the second transaction node is one-phase-aware;
        responsive to determining that the at least two transaction nodes are one-phase aware, convert the distributed transaction to a compensation transaction; and
        after converting the distributed transaction to the compensation transaction, enroll the third transaction node.

8. The system of claim 7, wherein to enroll the third transaction node the coordinator node is further programmed to:
    send the third transaction node a request to execute a third transaction operation on a third object;
    receive from the third transaction node a confirmation that the third transaction operation has been completed; and
    store a compensation transaction for the third transaction node, wherein the compensation action for the third transaction node, reverses the third transaction operation.

9. The system of claim 7, wherein to enroll the third transaction node the coordinator node is further programmed to:
    send the third transaction node a request to execute a third transaction operation on a third object;
    receive from the third transaction node an indication that the third transaction operation has failed;
    sending to the first transaction node an instruction to execute a compensation action reversing the first transaction operation; and
    sending to the second transaction node an instruction to execute a compensation action reversing the second transaction operation.

10. The system of claim 7, wherein converting the distributed transaction to a compensation transaction comprises requesting that the first transaction node release the lock for the first object.

11. The system of claim 10, wherein converting the distributed transaction to a compensation transaction further comprises generating a compensation action for the first transaction node, wherein the compensation action reverses the first transaction operation.

12. The system of claim 10, wherein converting the distributed transaction to a compensation transaction further comprises receiving from the first transaction node a compensation action, wherein the compensation action reverses the first transaction operation.

13. The system of claim 7, wherein the coordinator node is further configured to receive a request to coordinate the distributed transaction.

14. A computer-implemented system for coordinating a distributed transaction having a plurality of transaction nodes, including a first transaction node, a second transaction node, and a third transaction node, the system comprising:
at least one processor and operatively associated memory, wherein the at least one processor is programmed to execute a coordinator node for coordinating the distributed transaction, and wherein the coordinator node is programmed to:
send to the first transaction node a commit request indicating a first transaction operation and a first object;
write to a log an indication that the first transaction node is atomic-commit-protocol-enabled;
receive from the first transaction node a first indication that the first transaction node holds a first lock for the first object;
send to the second transaction node a commit request indicating a second transaction and a second object;
write to the log an indication that the second transaction node is one-phase-aware;
responsive to the second transaction node (i) receiving the commit request and (ii) being unable to support the atomic commit protocol, receive from the second transaction node a reply message indicating that the second transaction node is one-phase-aware;
responsive to receiving the reply message, determine that less than two transaction nodes are one-phase-aware by reading from the log at least the indication that the second transaction node is one-phase-aware;
indicate to the first transaction node that the distributed transaction was successful; and
enroll the third transaction node.

15. The system of claim 14, wherein the first transaction node is configured for an atomic commit protocol, and wherein coordinator node is further programmed to, before indicating to the first transaction node that the distributed transaction was successful, determine that a first plurality of transaction nodes configured for the atomic commit protocol have all committed to the distributed transaction, wherein the first plurality of transaction nodes configured for the atomic commit protocol comprises the first transaction node.

16. The system of claim 15, wherein the coordinator node is further programmed to, before indicating to the first transaction node that the distributed transaction was a success and after determining that the plurality of transaction nodes configured for the atomic commit protocol have all committed to the distributed transaction:
request that the second transaction node execute the second transaction operation on the second object; and
receive from the second transaction node an indication that the second transaction node has successfully executed the second transaction operation on the second object.

17. The system of claim 14, wherein indicating to the first transaction node that the distributed transaction was a success comprises at least one action selected from the group consisting of:
sending a success message to the first transaction node; or
failing to send an abort message to the first transaction node.

18. The system of claim 15, wherein the second transaction node is configured for a one-phase aware transaction, and wherein coordinator node is further programmed to determine that a second plurality of transaction nodes configured for the one-phase aware transaction have all indicated that they are one-phase aware to the coordinator node, wherein the second plurality of transaction nodes configured for the one-phase aware transaction comprises the second transaction node.

19. The system of claim 1, wherein the at least two transaction nodes is less than all transaction nodes in the plurality of transaction nodes.

20. The system of claim 19, wherein a number of the at least two transaction nodes depends on an amount of risk of failed atomicity indicated to be acceptable in the distributed transaction.

21. The system of claim 7, wherein the at least two transaction nodes is less than all transaction nodes in the plurality of transaction nodes.

22. The system of claim 14, wherein the two transaction nodes is less than all transaction nodes in the plurality of transaction nodes.

* * * * *